N. U. WALKER.
Clay-Pipe Tile Flue-Lining, &c.
No. 221,127.  Patented Oct. 28, 1879.
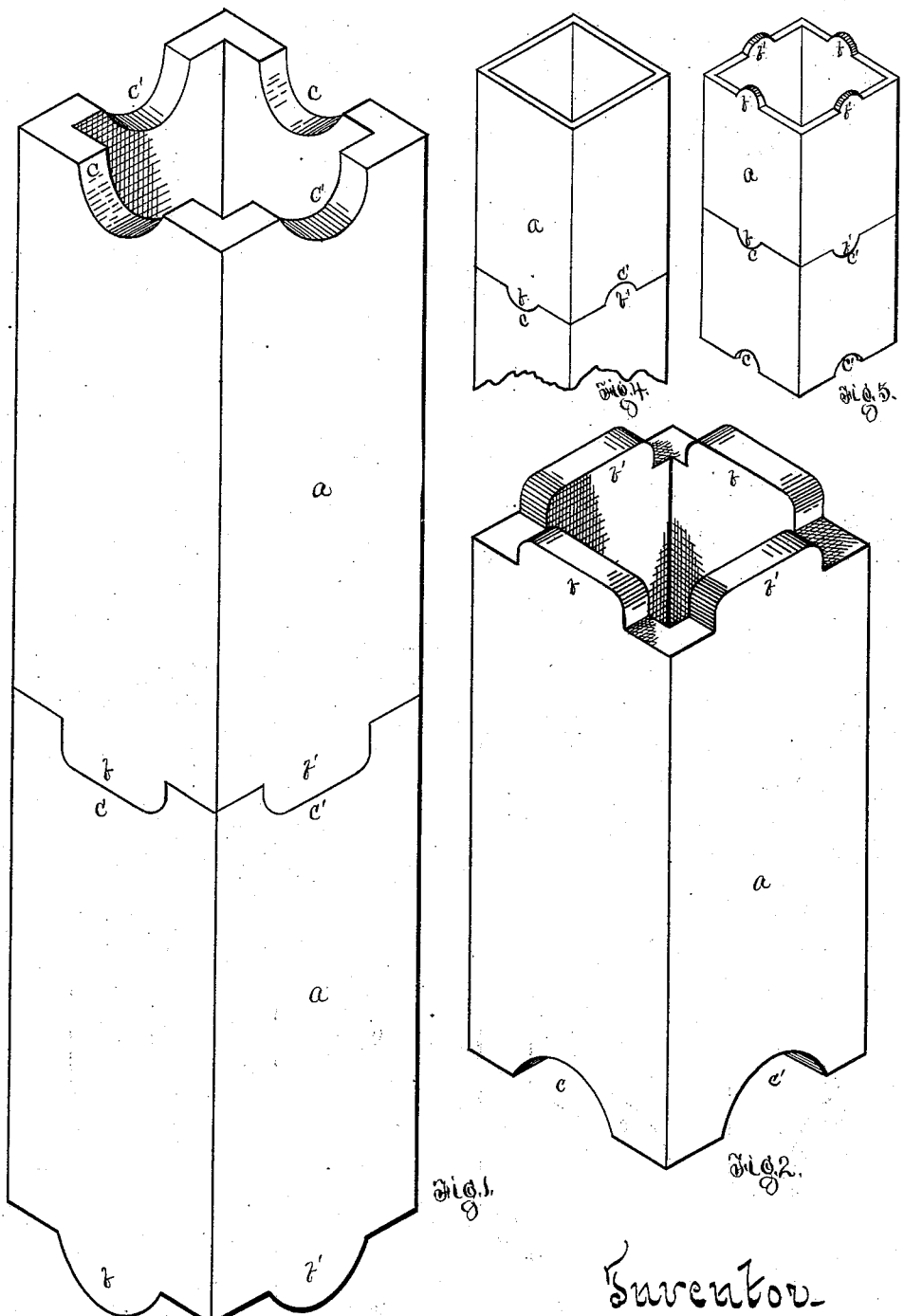

UNITED STATES PATENT OFFICE.

NATHAN U. WALKER, OF WELLSVILLE, OHIO.

IMPROVEMENT IN CLAY PIPES, TILES, FLUE-LININGS, &c.

Specification forming part of Letters Patent No. 221,127, dated October 28, 1879; application filed August 11, 1879.

*To all whom it may concern:*

Be it known that I, NATHAN U. WALKER, of Wellsville, in the county of Columbiana and State of Ohio, have invented a new and useful Improvement in Clay Pipes, Tiles, Flue-Linings, &c.; and I do hereby declare the following to be a full, clear, and exact description thereof, reference being had to the accompanying drawings, forming a part of this specification, in which—

Figure 1 is a perspective view of two sections of my improved flue-pipe joined together as when in use. Fig. 2 is a like view of one of the sections, and Figs. 3 and 4 are views of modified forms of the same.

Like letters of reference indicate like parts in each.

My invention relates to the construction of flue-linings and other sectional pipes, tubes, and conductors wherein the joining ends of the sections are of irregular form; and it consists in arranging one set of the irregular recesses and projections at such an angle to the other or others that the sections of a pipe shall be locked thereby against lateral displacement.

It happens that when smoke and hot-air flues are lined with straight-ended pipe the sections are often moved sidewise upon each other, being shoved out of place by careless building of the flue, making it crooked, reducing its size, and producing a smoky chimney and danger of fire.

To obviate this flue-linings have been made with projections, bowls, and sockets; but these increase the diameter at the joints and interfere with the proper building of the lining into the wall.

Pipe-sections have been made with one end beveled externally to a thin edge, and the other end beveled internally, so as to receive the externally-beveled end of the next section. Such sections are centered with each other, and are not liable to be moved out of place, but they are liable to be distorted in drying or baking and to be broken at the thinned edges in handling and transportation. This breakage is so excessive as to render their use very limited.

To obviate this in clay, terra-cotta, and cement pipe, I make the joining edges of my pipe of the full thickness of the sides throughout, and I thus reduce the danger of distortion in drying (when they are stood on end) and in baking and of breakage in handling and transportation to a minimum.

I prefer that the joining edges should have the form of tongues on one part and grooves on the other, and the governing feature of my invention is that one or more pairs of such counterparts shall stand at an angle to one or more more other pairs.

To enable others skilled in the art to make and use my invention, I will describe its construction and manner of use.

The flue-lining shown is made of a series of sections, $a$, joined together by projections or tongues $b\ b'$ on one part and recesses or grooves $c\ c'$ on the other part. For purposes of illustration I have shown two slightly different forms on the same section $a$; but in practice the projections and recesses on each section, whatever their form may be, should be counterparts of each other, so that the sections will always fit together, and thus confusion of parts be avoided.

The projections and recesses are made the full thickness of the pipe, and should have rounding corners and not be too narrow, so as to guard against breakage as much as possible.

I have shown the projections and recesses on all four sides of the pipe. When the sections are placed together the projections $b\ b'$, being at right angles to each other, will each prevent the sections from moving out of line of the other's recess—that is to say, projection $b$ will not permit projection $b'$ to move out of recess $c'$, and vice versa.

It is evident that two projections with their recesses, if arranged at an angle to each other, will hold the pipes from lateral displacement, so, also, if the pipe is round, triangular, or of other polygonal or irregular shape. I prefer, however, to have the projections formed at regular intervals around the entire pipe, as shown in Figs. 1 and 2 of the drawings. If the pipe is made of clay or like material the sections can then be stood on end in drying or baking. If the projections are not regular this cannot be done.

It is evident that some of the sections may be made with projections at both ends and others with recesses at both ends, as shown in Fig. 3, and also that a projection and a recess may be formed at one and the same end, as shown in Fig. 4.

This pipe-section cannot be displaced laterally, is centered with other like sections by simply placing them together, does not become distorted in drying or baking or easily broken in transportation or handling, is without enlargement at the joints, and is of uniform internal and external diameter throughout. When made of iron or other metal it possesses many of these advantages.

I am aware that pipes of a cylindrical form have been formed with a pair of corresponding tongues and grooves or recesses, set one diametrically opposite the other, and therefore that the broad idea of joining the sections of pipes by having their ends constructed irregularly or with tongues and recesses is not new, and therefore I do not claim the same; but in all previous cases known to me the edges of the tongues and ends of the grooves have been beveled, in order to prevent the lateral displacement of the sections, and such bevels leave acute angles, liable to be broken off, thus rendering the pipe more or less imperfect and useless.

The essential feature of construction whereby I obtain the desired result and avoid the objectionable feature of the above-recited construction is the arrangement of one set of irregularities or tongues and grooves at an angle to the other or others, so that one serves to lock the other or others. The locking-surfaces may be flat or straight, and liability of the lateral displacement of the sections is obviated without dovetailing the parts or forming acute and easily-broken angles thereon.

What I claim as my invention, and desire to secure by Letters Patent, is—

A pipe-section having interlocking edges, such as tongues and grooves, (either or both,) set at an angle with each other to adapt the section to lock against lateral displacement when the section is joined with its counterpart, substantially as specified.

In testimony whereof I, the said NATHAN U. WALKER, have hereunto set my hand this 6th day of August, A. D. 1879.

NATHAN U. WALKER.

Witnesses:
R. H. WHITTLESEY,
T. B. KERR.